(12) United States Patent
Fenchel

(10) Patent No.: US 6,321,344 B1
(45) Date of Patent: Nov. 20, 2001

(54) RELIABLE DISTRIBUTED PROCESSING SYSTEM

(75) Inventor: Gary Grant Fenchel, Lisle, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/209,099

(22) Filed: Dec. 10, 1998

(51) Int. Cl.$^7$ .............................. G06F 11/00; G06F 13/00
(52) U.S. Cl. .................................. 714/4; 710/107
(58) Field of Search .................. 714/4, 10, 25, 714/31; 712/11, 16; 710/107, 240, 244; 709/201, 208, 226; 370/400, 424; 340/825.06

(56) References Cited

U.S. PATENT DOCUMENTS

| | | | |
|---|---|---|---|
| 4,777,591 | * | 10/1988 | Chang et al. . |
| 5,247,694 | * | 9/1993 | Dahl . |
| 5,491,803 | * | 2/1996 | Herrmann et al. . |
| 5,953,510 | * | 9/1999 | Herzl et al. . |
| 5,999,976 | * | 12/1999 | Schmuck et al. . |

* cited by examiner

Primary Examiner—Gopal C. Ray
(74) Attorney, Agent, or Firm—Werner Ulrich

(57) ABSTRACT

A method and apparatus for implementing a highly reliable distributed processing system. The group of processors of the system are linked in a circular list, the final processor being linked to the first processor. Only one of the processors is a lead processor, and has the "Watchdog" data required of a lead processor. Only a lead processor can seize a global resource, and only a lead processor can switch another processor out of service. The successor processor to the lead processor contains a Ghost Object token, which is initially identical to the contents of the Watchdog token, except for an indication that it is a Ghost Object token. This next processor times from the time that it receives the Ghost Object token to insure that it will receive the Watchdog token within a pre-determined time. If it fails to receive the Watchdog token by the end of the time-out, it converts the Ghost Object token to a Watchdog token, and sends a new Ghost Object token to its own successor processor. Eventually, one of the successor processors tests the processor which timed-out, to insure that it is still operative, and if necessary, switches that processor out of service and changed the linkage of the list of processors to by-pass the processor that has been switched out of service. Advantageously, this arrangement allows for a highly reliable distributed multi-processing system without requiring extra hardware.

14 Claims, 1 Drawing Sheet

RELIABLE DISTRIBUTED PROCESSING SYSTEM

TECHNICAL FIELD

This invention relates to reliable distributed processing systems, and more specifically, to systems having means for detecting the failure of a controlling computer.

Problem

When the data processing load of a system, e.g., is large enough to require more than one processor, a distributed processing system is frequently used. This type of distributed processing system not only allows more processing to be performed, but has higher reliability if enough processors are provided so that the failure of one processor still leaves the system with enough processing power to handle the processing load.

In such systems, it is usually necessary to have one lead processor which is assigned the role of assigning global resources, a role which cannot be usefully performed by two processors simultaneously. In a distributed processing system, it is necessary to detect the failure of any processor, but it is especially important to detect the failure of a lead processor and to reassign that role to another processor, since the lead processor allocates global resources, such as space on a shared disk memory, and controls which processors are actually performing specific data processing functions.

Two approaches have been used to identify problems in the lead processor. In the reliable computing complex, (RCC) system manufactured by Lucent Technologies Inc., a special small processor, called a "Watchdog", continuously monitors the performance of the lead processor and other processors by verifying that their state information matches that expected by the Watchdog, and testing to make sure that each of them generate a "heart-beat" signal representing the successful performance of basic operating functions. The Watchdog, itself, is designed to be especially reliable.

In many other systems, there is a single processor which ends up being the lead processor. In RCC, that is the Watchdog hardware. For those systems using a lead processor, usually a personal computer (PC), some mechanism is used to select, (hopefully), a single PC or computer to perform that function. Once a lead PC is chosen, it does not move until there is some failure. In existing commercial systems, intermittent failures and other rare occurrences can sometimes cause a second PC to become a lead, and that causes a lot of trouble.

The Microsoft Cluster Solution, offered by the Microsoft Corporation, approaches this problem somewhat differently. They attempt to replicate all data simultaneously on all machines. Complicated algorithms are used to assure this happens correctly. Different complicated algorithms are used to determine which computer is entitled to obtain a shared device when more than one computer wants it. Neither of these algorithms is perfect. There is no issue about verifying that all data is replicated correctly on all machines, since there is a single place where the "golden" data lives.

Another approach in achieving reliable distributed processing systems is to assign a lead processor role to any one of the processors, and to have that lead processor perform the Watchdog role, i.e., the role of insuring that each of the other processors is still in satisfactory operating condition. A problem arises in such latter systems if for some reason, two processors simultaneously are set to a state wherein they perform the Watchdog role. Further, under such circumstances, the arrangements for detecting faulty processors and switching them off-line, tend to be very unreliable.

Solution

Applicant has overcome these problems, and has made a contribution over the prior art in an arrangement wherein the Watchdog role, which is carried by a token called a Watchdog object, travels periodically from processor to processor; in addition, the next processor to act as a Watchdog processor is initialized with Watchdog data via a "Ghost Object"; if the next processor does not receive the signal and data to become the new Watchdog, it will automatically seize the role of Watchdog, and in doing so, send a next Watchdog indicator ("Ghost Object"), to the next processor. A processor which receives a next Watchdog indicator, having a further indication that the predecessor processor did not pass on a Watchdog Token, will initiate tests of the processor that failed to send on this Watchdog Token. If the results indicate that a processor is faulty, it is switched out of the loop of processors performing the Watchdog function. Advantageously, this arrangement allows for a highly reliable assignment of a Watchdog role, and thereby makes possible a highly reliable distributed computing system; advantageously, no additional Watchdog apparatus is required.

DETAILED DESCRIPTION

Figure 1:
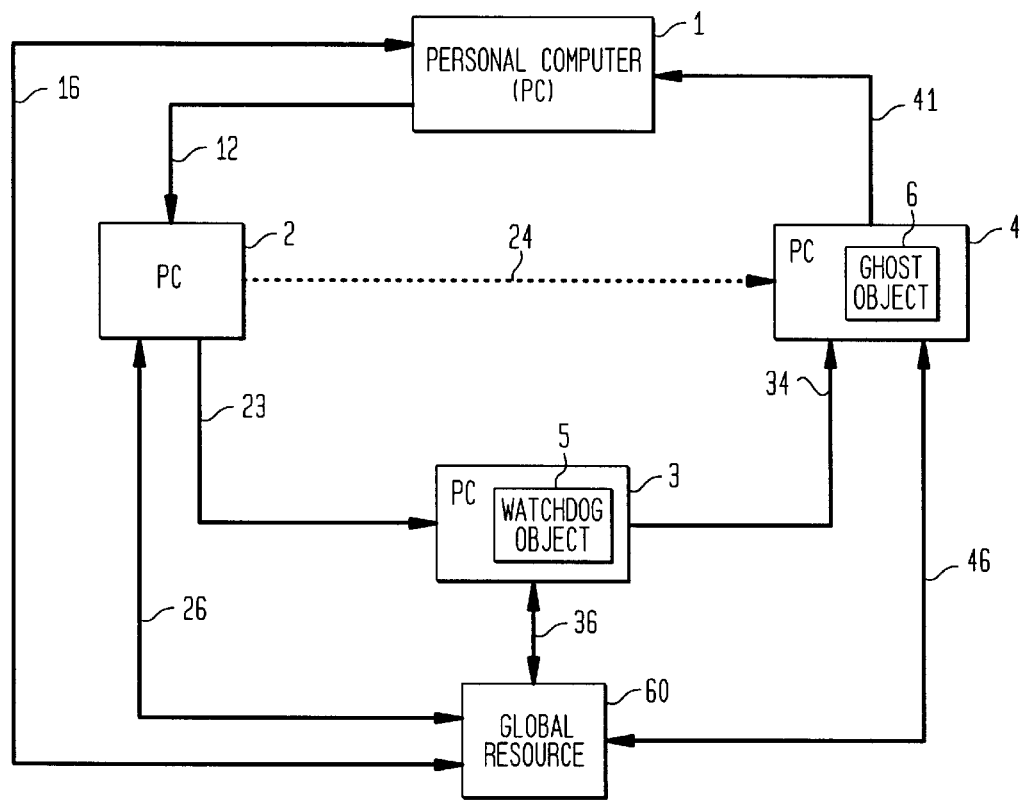
FIG. 1 is a Block Diagram illustrating a configuration of a Distributed Multi-Processing System.

FIG. 1 illustrates a four-Personal Computer (PC), Multi-Processing System. Four PCs, 1, 2, 3, 4, are shown as linked by links 12 between PC 1 and PC 2, links 23 between PC 2 and PC 3, links 34 between PC 3 and PC 4, and links 41 between PC 4 and PC 1. In the present state, PC 3 has the Watchdog Object Token. This token contains the data required by the Watchdog. PC 1, PC 2, PC 3, and PC 4 are further connected to a global resource 60, by links 16, 26, 36, and 46, respectively.

The Watchdog token and ghost token are identical except for a single field which identifies the token as either a Watchdog token or a ghost token. The fields in a Watchdog token are as follows:

TOKEN TYPE

Set to either "Watchdog" or "ghost".

SEQUENCE NUMBER

Each time the Watchdog token is passed on to another machine, this number is incremented by 1. At some large value, it wraps around back to zero.

NEXT MACHINE

This field is set to the identifier address, name, or some other identifier), of the next machine to receive the Watchdog token. As explained below, this information is especially useful if a ghost token ends up being converted to a Watchdog token, because it ends up specifying which machine failed to send the Watchdog token, since under these circumstances, the "next" field of the ghost token contains the identification of the failed machine.

STATE INFORMATION

This field contains all necessary state information on all devices. It is updated as needed. It consists of two subfields: the device identifier, and the current state for each device.

GLOBAL RESOURCE

DATA (Discussed further below).

CHECKSUM

This field contains a validity check of the previous fields. It is used to assure no corruption has occurred.

PC 4, the successor to PC 3, contains the Ghost Object 6, which has all the data of the Watchdog Object 5, but does not have an active activity indicator. At the time illustrated in the Block Diagram, PC 3 has Watchdog responsibilities for the system. PC 4 is timing to insure that the active Watchdog Token is passed to it within some time period, for example, 10 seconds, of the time it received the Ghost Object Token. If PC 4 receives the Watchdog Object Token 5 before the timer's time out, then it creates a Ghost Object Token 6 from the Watchdog Object Token and passes that Ghost Object Token 6 on to PC 1, and acts as the Watchdog of the system. If PC 4 fails to receive the Watchdog Object Token before a time out takes place, it converts the Ghost Object Token into an active Watchdog Object, and passes a Ghost Object Token on to PC 1, along with an indicator that PC 3 had failed to send a Watchdog Object. If during the time that PC 4 is the Watchdog and it receives the Watchdog Object Token from PC 3, then it sends a signal when it sends the Watchdog Object to PC 1, along with an indicator that PC 3 did succeed in passing on the Watchdog Object Token. If not, PC 1, when it receives the Watchdog Object Token, will attempt to establish communications with PC 3 to test whether PC 3 is capable of performing data processing and communicating with the other PCs, and to kill the Watchdog Object Token in PC 3 if it is still there. If PC 1 discovers that PC 3 is not capable of performing the data processing function, then PC 1 disables PC 3, and arranges that the successor to PC 2 is now PC 4, and the successor messages will be sent over the link between these two PCs, namely, link 24. When a PC passes on a Watchdog Token, it deletes or disables its own version of the token.

Each PC uses its most recent version of the Watchdog data as received with the most recent token. The process of allocating global resources is as follows:

The Watchdog token needs to carry all relevant information on each global resource. Any machine wanting a global resource, would need to wait until it received the Watchdog token. Global resources have four possible states: broken, free, reserved, ved, and in-use.

Broken, means that the resource is not available because it does not work.

Free, means that the resource is available to any machine capable of using it.

In-use, means that some machine is currently using the resource. The information carried in the Watchdog token needs to include the name of the machine using the resource, so that if that machine becomes inoperative, its resources can be freed.

Reserved, means that some machine wants it.

Assume that machine A wants global resource X. When A receives the Watchdog token, it examines the field describing X. If the resource is marked anything but "free", A knows it cannot have X.

If X is marked "free", A marks it "reserved". A eventually passes the Watchdog token along to its net. If any other machine wants X, it will note that X is not free. X will remain "reserved" until A once again receives the Watchdog token and marks X "in-use", (and then begins using X), or until A is removed from the system, when X will again be marked "free".

The reason it is necessary for A to initially mark X "reserved" rather than "in-use", is to avoid the following scenario:

A decides it wants X. A marks X "in-use". However, due to some unrelated problem, A's next does not receive the Watchdog token before the timer expires, (Assume B is A's next). B promotes its ghost token to a Watchdog token. Before B passes on the token to C, it decides to take the resource X. B marks X "in-use", and passes it along to C. At this point, both A and B think that they, (exclusively), own resource X.

By requiring a machine to place a resource in the "reserved" state before actually taking it, the above scenario is avoided. If both A and B end up thinking that they have reserved X, when A next receives the Watchdog token, it will realize it does NOT have X reserved, (because B has it reserved), and it will surrender its claim. B will end up being able to take X. If A successfully reserves X, but the time expires when it tries to mark X "in-use", that too is harmless. No other machine will take X as long as it is marked "reserved" in the Watchdog token. When the Watchdog token next comes to A, it can safely mark X as "in-use".

In a typical system, each machine would own the Watchdog token for about 1 or 2 seconds before passing it on; the timer would expire after about twice that interval.

Effectively, each processor becomes a lead processor when it receives the Watchdog token, and loses that status when it passes this token on.

In case of trouble, there is no need to kill the Watchdog token in a failed processor. If a processor fails, it will not pass along the Watchdog token when the token is received. If A, B, C, and D are computers linked in alphabetical order, (with D linked to A to make a circle), then A passes the Watchdog token to B, and the ghost token to C. If C fails to receive the Watchdog token, (within a set time), from B, then C suspects B is in trouble; it changes the ghost token to a Watchdog token, and passes the Watchdog token on to D, and the ghost token to A. C also changes B's state to "suspect". D then attempts to contact B. If it succeeds, it changes B's state to "trusted"; if it fails, it changes B's state to "initializing". Thus, there is no need to actively kill the Watchdog token.

In case B is very, very slow, it will send C the Watchdog token, but it is after C should have received the token. C has already converted the ghost token to a Watchdog token and passed it on to D. By inspecting the sequence number in the Watchdog token, C is able to deduce that this token is late, and the token is completely ignored.

Figure 2:
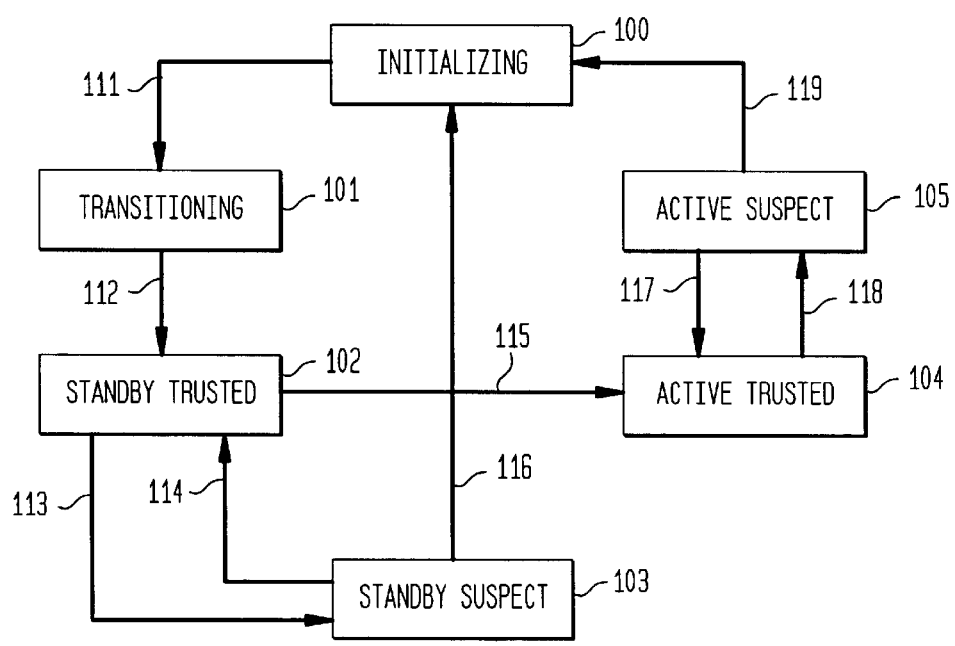
FIG. 2 is a State Diagram illustrating the states of one of the computers in the Multi-Processing System.

FIG. 2 illustrates the various states of a PC and the causes for transition.

The state transitions causes are:

111: Transition from state 100 (Initializing) to state 101 (Transitioning);

a machine is ready to do useful work.

112: Transition from state 101 to state 102 (Standby Trusted);

a machine has been invited to join a working system. During system boot up only, it is possible for a machine to promote itself from transitioning to standby trusted. Usually, however, a machine already in the system, informs a transitioning machine that it may join the system.

113: Transition from state 102 to state 103 (Standby Suspect);

a machine's next has failed to receive a Watchdog token before timeout. It will convert the ghost token to a Watchdog token, and mark the machine, which should have sent it the Watchdog token suspect.

114: Transition from state 103 to state 102;

a machine's next, next has successfully contacted while it held the Watchdog token. In a system with only two machines, each machine is its own next, next.

115: Transition from state 102 to state 104 (Active Trusted);
  a machine which has the Watchdog token, has noticed that another standby machine is needed, and so it has promoted its next. When the net machine gets the token, it will do whatever is necessary to transition to the new state so long as the token is valid.

116: Transition from state 103 to state 100;
  a machine's next, next has been unable to successfully contact the machine while it held the Watchdog token. The machine will be removed from the system. This involves allowing renegotiation of next and next, next fields on the appropriate machines.

117: Transition from state 105 (Active Suspect) to state 104;
  a machine's next, next has successfully contacted while it held the Watchdog token.

118: Transition from state 104 to state 105;
  a machine's next has failed to receive a Watchdog token before timeout. It will convert the ghost token to a Watchdog token and mark the machine, which should have sent it the Watchdog token suspect.

119: Transition from state 105 to state 100;
  a machine's next, next has been unable to successfully contact the machine while it held the Watchdog token. The machine will be removed from the system. This involves allowing re-negotiation of next and next, next fields on the appropriate machines.

Invalid tokens are ignored. A token is considered invalid if any of the following are true:

1) The checksum indicates data corruption anywhere in the token.
2) The sequence number is an unexpected value. For simplicity's sake, ignore the fact that the sequence number wraps back to zero. In that case, sequence numbers are always expected to be at least one larger than has been seen before in either a Watchdog, or ghost token.

Once a token is declared valid, the following events occur:

1) If it is a ghost token, a timer is started to assure that the Watchdog token arrives.
2) If it is a ghost token and the timer expires, it is promoted to a Watchdog token, and the sequence number is incremented.
3) If it is a ghost token and a valid Watchdog token arrives prior to timer expiration, the ghost token is discarded.
4) The sequence number is incremented. Notice that if this is a converted ghost token, this is the second time this number will have been incremented.
5) All states are checked. If the current machine needs to do something to get its state to agree with the Watchdog token, it does so. This would be necessary for example, if this machine had been promoted from standby trusted, to active trusted.
6) If another machine needs it state changed on the Watchdog token, it is done now.
7) The checksum is updated.
8) The machine passes the Watchdog token to its next, and sends a nearly identical ghost token to its next, next. Only the token type and the checksum fields differ between the ghost token transmitted, and the Watchdog token transmitted.

While this illustrative embodiment shows a group of PCs interconnected in the form of a ring, with separate connections to a global resource, it is understood that many types of data networks can be used to interconnect the PCs with each other, and with one or more global resources. The particular choice of the preferred embodiment was, in part, to illus. trate the progress of the Watchdog and Ghost tokens. Clearly, the PCs could be other types of computers or processors, such as individual microprocessors, or microcomputers.

The above embodiment is one preferred embodiment of Applicant's invention. Many other embodiments will be apparent to those of ordinary skill in the art. Applicant's invention is limited only the attached claims.

What is claimed is:

1. A multi-processing system comprising:
  a plurality of processors; and
  means for communicating among the processors;
  wherein the processors are linked in an ordered list;
  wherein one of the processors has in its memory, the data of a Watchdog token; and
  wherein a next processor to said one processor has in its memory, a Ghost Object token;
  wherein said Ghost Object token is initially the same as said Watchdog token, except for an indication that the Ghost Object token is not the Watchdog token;
  wherein the one processor that has the Watchdog token is the lead processor of the multi-processing system; and
  wherein the Watchdog token is passed periodically to a next processor; and
  the next processor then passes a Ghost Object token to the following processor.

2. The multi-processing system of claim 1, wherein only the lead processor can allocate global resources.

3. The multi-processing system of claim 1, wherein only the lead processor can switch another processor out of service.

4. The multi-processing system of claim 3, wherein when a processor is switched out of service, linking an immediate predecessor processor of the processor being switched out of service to a next processor of the processor being switched out of service.

5. The multi-processing system of claim 1, wherein a processor holding a Ghost Object token performs timing to insure that the processor holding the Ghost Object token receives the Watchdog token within a pre-specified period of time; and
  if the holder of Ghost Object token does not receive the Watchdog token within the pre-determined time, the holder converts the Ghost Object token to a Watchdog token, and sends a Ghost Object token to its successor processor.

6. The multi-processing system of claim 5, wherein a successor processor of the processor which failed to pass a Watchdog token within a time-out interval tests that processor, and if necessary, switches that processor out of service.

7. The multi-processing system of claim 1, wherein only a lead processor can allocate a global resource; and
  wherein allocating a global resource comprises reserving said global resources by a particular lead processor, and only seizing said global resource when the particular processor again becomes the lead processor after having relinquished the role of lead processor.

8. In a multi-processing system comprising:
  a plurality of processors, and means for communicating among the processors, a method for obtaining reliable performance, comprising the steps of:

linking the processors in an ordered list;

storing in one of the processors data of a Watchdog token;

storing in a next processor to said one processor a Ghost Object token;

periodically passing the Watchdog token to a next processor; and then passing a Ghost Object token from the next processor to the following processor;

wherein the one processor that has the Watchdog token is the lead processor of the multiprocessing system; and wherein said Ghost Object token is initially the same as said Watchdog token, except for an indication that the Ghost Object token is not the Watchdog token.

9. The method of claim 8, further comprising the step of:

allocating global resources only from said lead processor.

10. The method of claim 8, further comprising the step of:

switching another processor out of service;

wherein only said lead processor can perform the step of switching another processor out of service.

11. The method of claim 10, further comprising the step of:

when a processor is switched out of service, linking an immediate predecessor processor of the processor being switched out of service to a next processor of the processor being switched out of service.

12. The method of claim 8, further comprising the steps of:

a processor holding a Ghost Object token performs timing to insure that the processor holding the Ghost Object token receives the Watchdog token within a pre-specified period of time; and if the holder of Ghost Object token does not receive the Watchdog token within the predetermined time, the holder converts the Ghost Object token to a Watchdog token, and sends a Ghost Object token to its successor processor.

13. The method of claim 12, further comprising the step of:

one of the successor processors of the processor which failed to pass a Watchdog token within a time-out interval tests that processor, and if necessary, switches that processor out of service.

14. The method of claim 8, further comprising the step of:

a lead processor and only a lead processor allocates a global resource;

wherein allocating a global resource comprises reserving said global resource by a lead processor, and only seizing said global resource when the particular processor again becomes the lead processor after having relinquished the role of lead processor.

* * * * *